United States Patent
Hajika

(10) Patent No.: US 10,780,882 B2
(45) Date of Patent: Sep. 22, 2020

(54) LANE KEEPING CONTROLLER

(71) Applicant: SUBARU CORPORATION, Tokyo (JP)

(72) Inventor: Ryo Hajika, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 13 days.

(21) Appl. No.: 16/403,085

(22) Filed: May 3, 2019

(65) Prior Publication Data
US 2020/0079372 A1    Mar. 12, 2020

(30) Foreign Application Priority Data

Sep. 12, 2018    (JP) ................................ 2018-170860

(51) Int. Cl.
*B62D 6/00*        (2006.01)
*B60W 30/12*       (2020.01)
*G08G 1/16*        (2006.01)

(52) U.S. Cl.
CPC ............ *B60W 30/12* (2013.01); *G08G 1/167* (2013.01); *B60W 2552/30* (2020.02); *B60W 2710/207* (2013.01); *B60W 2720/14* (2013.01)

(58) Field of Classification Search
None
See application file for complete search history.

(56) References Cited

U.S. PATENT DOCUMENTS

| 7,996,131 | B2 * | 8/2011 | Yamashita | G01B 21/22 280/735 |
| 2002/0007236 | A1 * | 1/2002 | Sadano | B62D 1/28 701/28 |
| 2002/0013647 | A1 * | 1/2002 | Kawazoe | B62D 1/28 701/41 |
| 2005/0107931 | A1 * | 5/2005 | Shimakage | G08G 1/167 701/41 |
| 2009/0088926 | A1 * | 4/2009 | Yamashita | G01C 9/00 701/41 |
| 2012/0123643 | A1 * | 5/2012 | Limpibuntering | B62D 1/286 701/42 |

(Continued)

FOREIGN PATENT DOCUMENTS

| JP | 2013-091370 A | 5/2013 |
| JP | 2014-118024 A | 6/2014 |

*Primary Examiner* — Shelley Chen
(74) *Attorney, Agent, or Firm* — McDermott Will & Emery LLP

(57) ABSTRACT

A lane keeping controller includes a first initial target steering angle calculator, a second initial target steering angle calculator, and a steering angle calculator. A first arithmetic unit of the first initial target steering angle calculator performs a first arithmetic operation to calculate a first initial target steering angle using a lane curvature so that a vehicle runs along the lane curvature. A second arithmetic unit of the second initial target steering angle calculator performs a second arithmetic operation to calculate a second initial target steering angle using a yaw angle deviation so that a yaw angle to lane agrees with a target yaw angle. During execution of override control, the lane curvature and the yaw angle deviation are not corrected and a target steering angle is made to be small in comparison with that during execution of normal lane keeping control.

12 Claims, 8 Drawing Sheets

(56) References Cited

U.S. PATENT DOCUMENTS

| | | | |
|---|---|---|---|
| 2016/0114832 A1* | 4/2016 | Taniguchi | B62D 15/025 |
| | | | 701/41 |
| 2018/0057054 A1* | 3/2018 | Tokoro | B60R 11/04 |
| 2018/0201317 A1* | 7/2018 | Kudo | B62D 15/025 |
| 2018/0257646 A1* | 9/2018 | Takeuchi | G06K 9/00825 |
| 2018/0297640 A1* | 10/2018 | Fujii | B62D 15/0255 |
| 2018/0345978 A1* | 12/2018 | Fujii | B62D 15/0255 |

\* cited by examiner

LANE KEEPING CONTROLLER

CROSS-REFERENCE TO RELATED APPLICATIONS

The present application claims priority from Japanese Patent Application No. 2018-170860 filed on Sep. 12, 2018, the entire contents of which are hereby incorporated by reference.

BACKGROUND

The technology relates to a lane keeping controller that performs lane keeping control for making an own vehicle run along a lane.

In recent years, for vehicles, various driving assistance devices using automatic driving techniques have been developed and put in practical use so that drivers can drive more comfortably and safely. As one of the driving assistance devices, a lane keeping controller that performs lane keeping control for making an own vehicle to run along a lane is known. In the lane keeping control, for instance, a path of travel of an own vehicle is estimated based on a result of recognition of a lane by a camera mounted in the vehicle and control for keeping the own vehicle at a center of the path of travel is performed by adding a predetermined steering force to steering or performing automatic steering.

The center of the path of travel is basically set at a center of the lane. However, if the driver intentionally moves the own vehicle closer to a demarcation line of the lane because of, e.g., the reason that a vehicle running on an adjacent lane is close to the own vehicle, the driver operates the steering in a direction in which the own vehicle moves away from the center of the lane. In this case, a control torque in a direction in which the own vehicle is moved closer to the center of the lane acts on the steering. The direction of the control torque is opposite to the direction of the operation by the driver and thus makes the driver feel odd.

As a method for reducing an odd feeling caused by a control torque based on driving assistance control, for instance, like the technique disclosed in Japanese Unexamined Patent Application Publication (JP-A) No. 2013-91370, there is a method in which if an own vehicle deviates from a path of travel set by a steering assistance device, a steering assistance torque is made to be smaller as a distance between an obstacle and the own vehicle is larger, to lower a rate of interference of the steering assistance torque with a steering torque of steering of steered wheels by the driver. Also, as another method, like the technique disclosed in JP-A No. 2014-118024, there is a method in which a steering torque is made to be different between a steering angle increasing direction and a steering angle decreasing direction and also the steering torque is made to be different depending on whether a torque for lane keeping assistance is provided.

SUMMARY

An aspect of the technology provides a lane keeping controller for performing lane keeping control to make an own vehicle to run along a lane. The lane keeping controller is capable of selectively executing first control and second control that are different from each other in manner of the lane keeping control, as the lane keeping control. The lane keeping controller includes a curvature acquiring unit configured to acquire information on a lane curvature that is a curvature of the lane; a yaw angle-to-lane acquiring unit configured to acquire information on a yaw angle to lane that is a yaw angle of the own vehicle relative to the lane; a steering torque acquiring unit configured to acquire information on a steering torque of steering by a driver; a determiner configured to determine whether to execute the second control, based on the steering torque; and a steering angle calculating unit configured to calculate a target steering angle of the own vehicle in the lane keeping control. During execution of the first control, if a direction of the steering torque is a direction deviating from the lane and a magnitude of the steering torque is no less than a predetermined threshold value, the determiner makes a determination to execute the second control, and the steering angle calculating unit performs a first arithmetic operation to calculate a first initial target steering angle using the lane curvature so that the own vehicle runs along the lane curvature, a second arithmetic operation to calculate a second initial target steering angle using a yaw angle deviation that is a difference between a predetermined target yaw angle and the yaw angle to lane so that the yaw angle to lane agrees with the predetermined target yaw angle, and a third arithmetic operation to calculate the target steering angle by an arithmetic operation including calculation of a sum of the first initial target steering angle and the second initial target steering angle, and during execution of the second control, does not correct the lane curvature and the yaw angle deviation and makes the target steering angle small in comparison with the target steering angle during the execution of the first control.

An aspect of the technology provides a lane keeping controller configured to perform lane keeping control to make an own vehicle to run along a lane. The lane keeping controller is capable of selectively executing first control and second control that are different from each other in manner of the lane keeping control, as the lane keeping control. The lane keeping controller includes circuitry configured to acquire information on a lane curvature that is a curvature of the lane, acquire information on a yaw angle to lane that is a yaw angle of the own vehicle relative to the lane, acquire information on a steering torque of steering by a driver, determine whether to execute the second control, based on the steering torque, and calculate a target steering angle of the own vehicle in the lane keeping control. During execution of the first control, if a direction of the steering torque is a direction deviating from the lane and a magnitude of the steering torque is no less than a predetermined threshold value, the circuitry makes a determination to execute the second control, and performs a first arithmetic operation to calculate a first initial target steering angle using the lane curvature so that the own vehicle runs along the lane curvature, a second arithmetic operation to calculate a second initial target steering angle using a yaw angle deviation that is a difference between a predetermined target yaw angle and the yaw angle to lane so that the yaw angle to lane agrees with the predetermined target yaw angle, and a third arithmetic operation to calculate the target steering angle by an arithmetic operation including calculation of a sum of the first initial target steering angle and the second initial target steering angle, and during execution of the second control, does not correct the lane curvature and the yaw angle deviation and makes the target steering angle small in comparison with the target steering angle during the execution of the first control.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A description is given below of some embodiments of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following embodiments which are not recited in a most-generic independent claim of the disclosure are optional and may be provided on an as-needed basis. The drawings are schematic and are not intended to be drawn to scale.

Driving assistance devices such as a lane keeping controller are configured so as to be able to, if a driver performs a predetermined driving operation (a steering operation, an acceleration pedal operation, or a brake pedal operation) during execution of driving assistance control, perform override control for prioritizing an intension of the driver and suppressing the driving assistance control to change a manner of the driving assistance control so that the driving operation by the driver is prioritized. In a case where the override control is performed during execution of lane keeping control, if a control torque is uniformly decreased, the own vehicle may deviate from the running lane. Neither the technique disclosed in JP-A No. 2013-91370 nor the technique disclosed in JP-A No. 2014-118024 can prevent an own vehicle from deviating from a running lane during execution of override control.

Therefore, it is desirable to provide a lane keeping controller that can prevent an own vehicle from deviating from a running lane during execution of override control.

Figure 1:
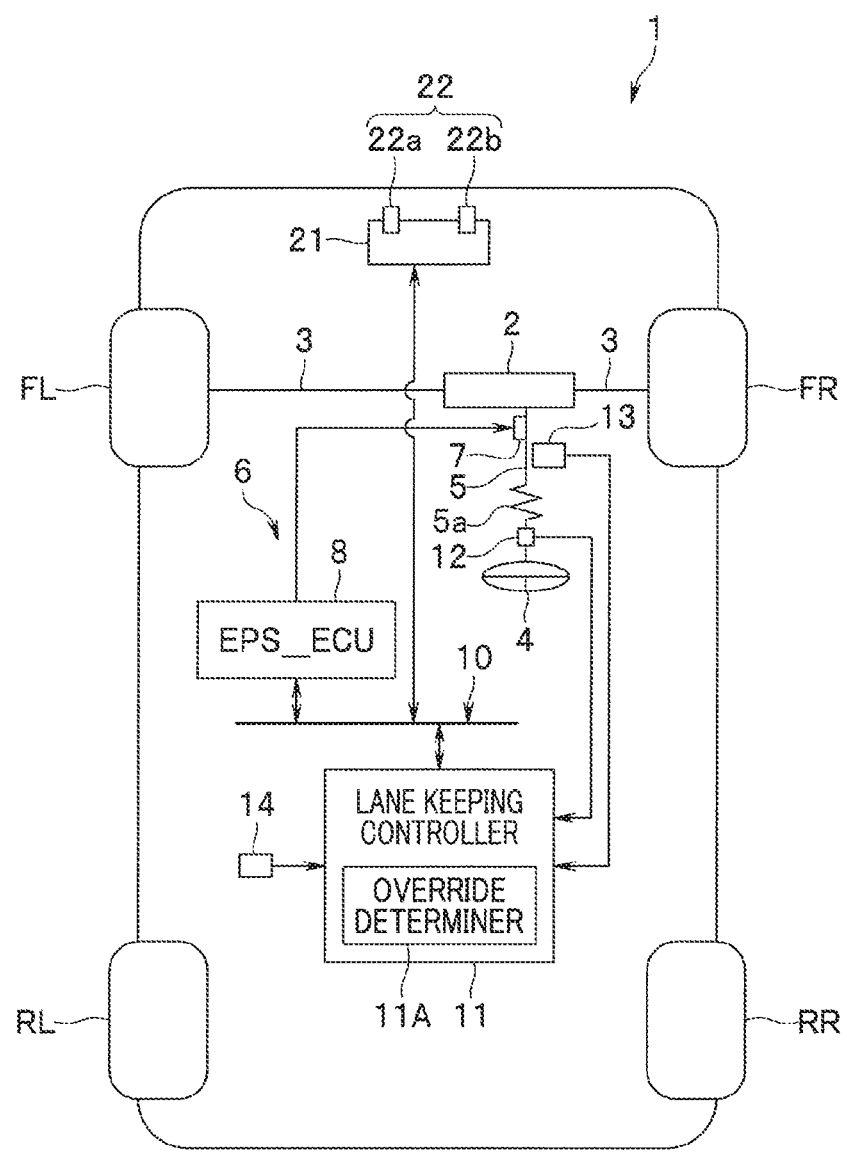
FIG. 1 is a diagram illustrating a schematic configuration of a vehicle in which a lane keeping controller according to an embodiment of the technology is mounted.

An embodiment of the technology will be described below with reference to the drawings. First, a schematic configuration of a vehicle in which a lane keeping controller according to the embodiment will be described with reference to FIG. 1. As illustrated in FIG. 1, a vehicle 1 includes a front left wheel FL, a front right wheel FR, a rear left wheel RL, and a rear right wheel RR. The below description will be provided taking a case where the front left and right wheels FL, FR are driving wheels and steered wheels as an example.

The vehicle 1 further includes a steering mechanism 2, for instance, a rack-and-pinion mechanism. The front left and right wheels FL, FR are coupled to the steering mechanism 2 via a tie rod 3 and a steering shaft 5 with a steering wheel 4 fixed at a distal end thereof is coupled to the steering mechanism 2. The front left and right wheels FL, FR are turned to the left/right directions via the steering mechanism 2 by operation of the steering wheel 4 by a driver.

The vehicle 1 further includes an electric power steering device (hereinafter referred to as "EPS device") 6. The EPS device 6 includes an electric power steering motor (hereinafter referred to as "EPS motor") 7 and an electric power steering control unit (hereinafter referred to as "EPS control unit") 8. Note that in FIG. 1, the EPS control unit is indicated as "EPS_ECU". The EPS motor 7 is joined to the steering shaft 5 via a non-illustrated transmission mechanism.

The EPS control unit 8 sets an assistance torque that assists a steering torque of steering by the driver, based on results of detection by a steering angle sensor and a vehicle condition acquiring unit, which will be described later. Also, the EPS control unit 8 controls the EPS motor 7 so that the set assistance torque is applied to the steering shaft 5.

Also, the vehicle 1 further includes a lane keeping controller 11 according to the embodiment. The EPS control unit 8 and the lane keeping controller 11 are connected with an in-vehicle network 10 such as a controller area network (CAN). Although not illustrated, a plurality of units that control a state of running of the vehicle 1, such as an engine control unit, a transmission control unit, and a brake control unit, are further connected with the in-vehicle network 10.

The lane keeping controller 11 is a device that executes lane keeping control for making the vehicle 1 run along a lane. At the time of execution of the lane keeping control, the lane keeping controller 11 sets a control torque that is an assistance torque and transmits an instruction signal corresponding to the set control torque to the EPS control unit 8. The EPS control unit 8 controls the EPS motor 7 based on the received instruction signal so that the set control torque is applied to the steering shaft 5.

Also, the vehicle 1 further includes a steering torque sensor 12 that detects a steering torque, input to the steering wheel 4 by the driver, from a deflection angle of a torsion-bar spring 5a installed at the steering shaft 5. The steering torque sensor 12 is coupled to the lane keeping controller 11. Note that whether the steering torque is positive or negative is defined according to whether a direction of operation of the steering wheel 4 is a left-turning direction or a right-turning direction.

The lane keeping controller 11 can selectively execute first control and second control that are different from each other in manner of the lane keeping control, as the lane keeping control. In the embodiment, the first control is normal lane keeping control and the second control is override control for changing the manner of the lane keeping control so as to prioritize a driving operation by the driver.

In the embodiment, the lane keeping controller 11 includes an override determiner 11A as a steering torque acquiring unit that acquires information on a steering torque of steering by the driver and a determiner that determines whether to execute the override control. Hereinafter, a determination of whether to execute the override control is referred to as an "override determination". The override determiner 11A acquires information on the steering torque detected by the steering torque sensor 12 and makes an override determination based on the acquired steering torque. During execution of the override control, the override determiner 11A further determines whether to stop the override control and execute the normal lane keeping control, based on the steering torque detected by the steering torque sensor 12. Hereinafter, a determination of whether to stop the override control and execute the normal lane keeping control is referred to as a "stoppage determination".

Note that as described later, if the steering torque is no less than a predetermined threshold value, the override determiner 11A makes a determination to execute the override control. If the steering torque is no less than a cancellation threshold value, which is a threshold value larger than the predetermined threshold value, the lane keeping controller 11 cancels the lane keeping control itself and switches to manual driving by the driver. The determination of cancellation of the lane keeping control may be made by the override determiner 11A.

Furthermore, a steering angle sensor 13 and a vehicle condition acquiring unit 14 are coupled to the lane keeping controller 11. The steering angle sensor 13 detects a steering angle of the steering wheel 4. The vehicle condition acquiring unit 14 is a collective term of sensors that acquire conditions of the vehicle 1. More specifically, for instance, the vehicle condition acquiring unit 14 includes e.g., a vehicle speed sensor that detects a vehicle speed of the vehicle 1, a lateral acceleration sensor that detects a lateral acceleration of the vehicle 1 and a yaw rate sensor that detects a yaw rate of the vehicle 1.

The lane keeping controller 11 further includes a steering angle calculating unit that calculates a target steering angle of the vehicle 1 in the lane keeping control. Details of the steering angle calculating unit will be described later.

Figure 2:
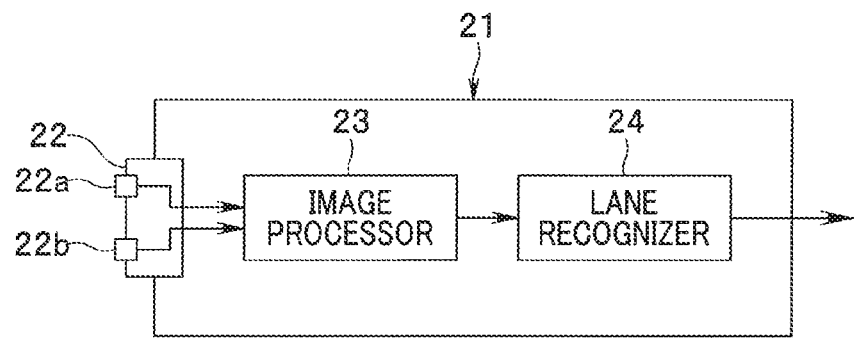
FIG. 2 is a functional block diagram illustrating a configuration of a camera unit in the embodiment of the technology.

The vehicle 1 further includes a camera unit 21. Here, the camera unit 21 will be described in detail with reference to FIGS. 1 and 2. FIG. 2 is a functional block diagram illustrating a configuration of the camera unit 21. The camera unit 21 includes a vehicle-mounted camera 22 configured by a stereo camera including a main camera 22a and a sub camera 22b, an image processor 23, and a lane recognizer 24.

The cameras 22a, 22b are each disposed, for instance, at a predetermined distance from a center in a vehicle width direction in the vicinity of a front windshield in a cabin. The cameras 22a, 22b each include an image pickup device such as CCD or CMOS. The image pickup device picks up an image of a running environment ahead in a direction of travel of the vehicle 1.

The image processor 23 converts a pair of analog images picked up by the cameras 22a, 22b into a digital image of a predetermined luminance gradation. Also, the image processor 23 generates reference image data based on the image picked up by the main camera 22a and generates comparative image data based on the image picked up by the sub camera 22b. Then, the image processor 23 calculates distance data indicating a distance from the vehicle 1 to a target based on a disparity between the reference image data and the comparative image data.

The lane recognizer 24 recognizes lane demarcation lines drawn on opposite, left and right, sides of the lane on which the vehicle 1 runs, and based on results of the recognition of the lane demarcation lines, calculates a vehicle lateral position, which is a position in the vehicle width direction of the vehicle 1, a target lateral position, a curvature of the lane on which the vehicle 1 runs (hereinafter referred to as a "lane curvature") and a yaw angle of the vehicle 1 relative to the lane (hereinafter referred to as a "yaw angle to lane"). In the embodiment, the target lateral position is a center of the lane, the center being defined from the left and right lane demarcation lines. Note that in the embodiment, whether the curvature is positive or negative is determined according to whether to turn to the left direction or the right direction.

The lane recognizer 24 calculates the lane curvature and the yaw angle to lane as follows, for instance. First, the lane recognizer 24 generates a virtual road plane based on the reference image data and the comparative image data. Next, based on the distance data, the lane recognizer 24 plots inner edges of the left and right lane demarcation lines on the generated virtual road plane. Next, the lane recognizer 24 calculates curvatures of the left and right inner edges. Next, the lane recognizer 24 calculates the lane curvature and the yaw angle to lane based on the curvatures of the left and right inner edges.

The EPS control unit 8, the lane keeping controller 11, and the camera unit 21 are each configured mainly by, for instance, a microcomputer including, e.g., a CPU, ROM, and RAM. In the ROM, control programs for executing operations set for respective systems are stored.

Figure 3:
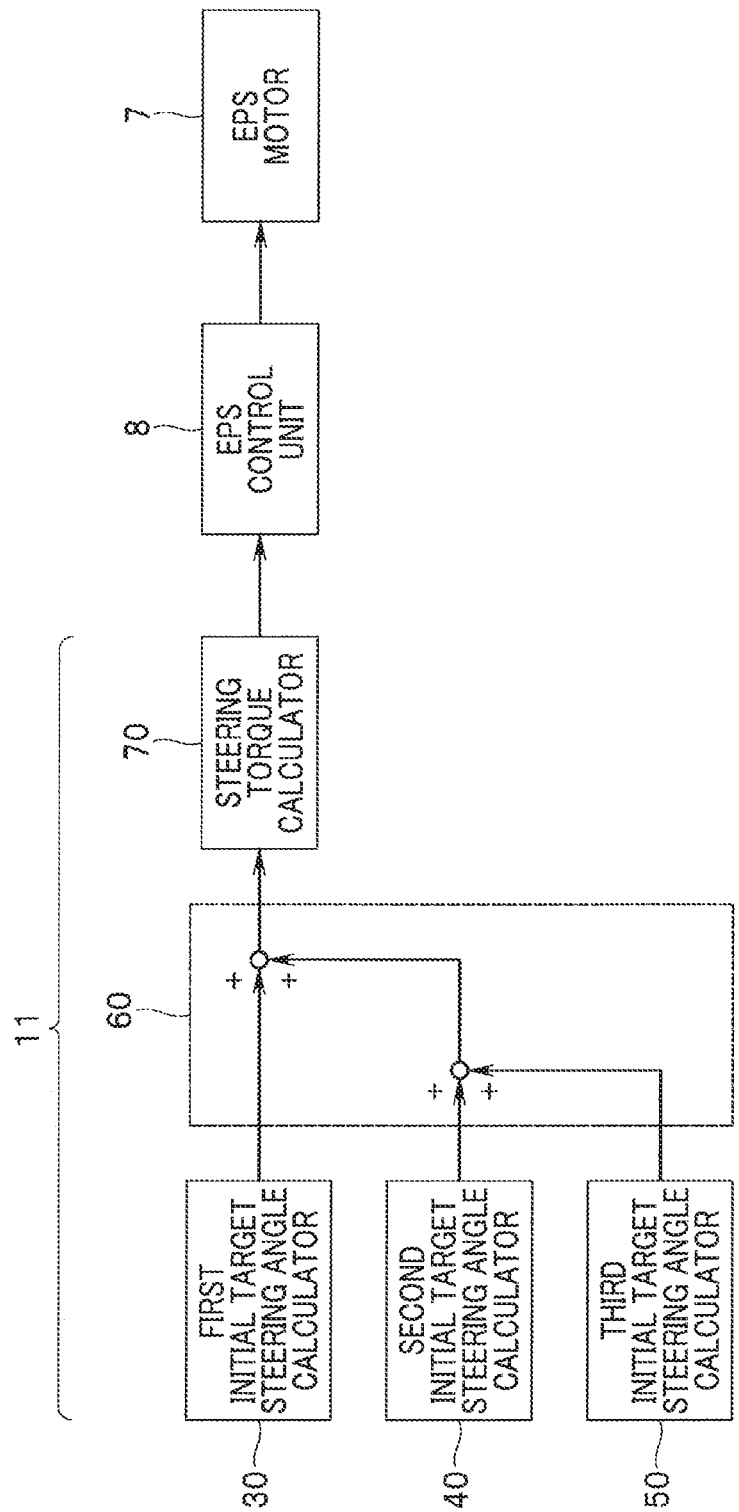
FIG. 3 is a functional block diagram illustrating a configuration of a lane keeping controller according to the embodiment of the technology.

Next, details of the steering angle calculating unit of the lane keeping controller 11 will be described with reference to FIG. 3. FIG. 3 is a functional block diagram illustrating a configuration of the lane keeping controller 11. In the embodiment, the lane keeping controller 11 includes a first initial target steering angle calculator 30, a second initial target steering angle calculator 40, a third initial target steering angle calculator 50, and a steering angle calculator 60, as the steering angle calculating unit. The first initial target steering angle calculator 30 calculates a first initial target steering angle. The second initial target steering angle calculator 40 calculates a second initial target steering angle. The third initial target steering angle calculator 50 calculates a third initial target steering angle. The steering angle calculator 60 executes a third arithmetic operation to calculate a target steering angle by means of an arithmetic operation including calculation of a sum of the first initial target steering angle and the second initial target steering angle. In the embodiment, the steering angle calculator 60 calculates a target steering angle by means of an arithmetic operation to calculate a sum of the first initial target steering angle, the second initial target steering angle, and the third initial target steering angle.

The lane keeping controller 11 further includes a steering torque calculator 70 that calculates a steering torque based on the target steering angle. In the embodiment, the steering torque calculated by the steering torque calculator 70 is set as the aforementioned control torque, that is, the assistance torque at the time of execution of the lane keeping control. As described above, an instruction signal corresponding to the set control torque is transmitted to the EPS control unit 8.

Figure 4:
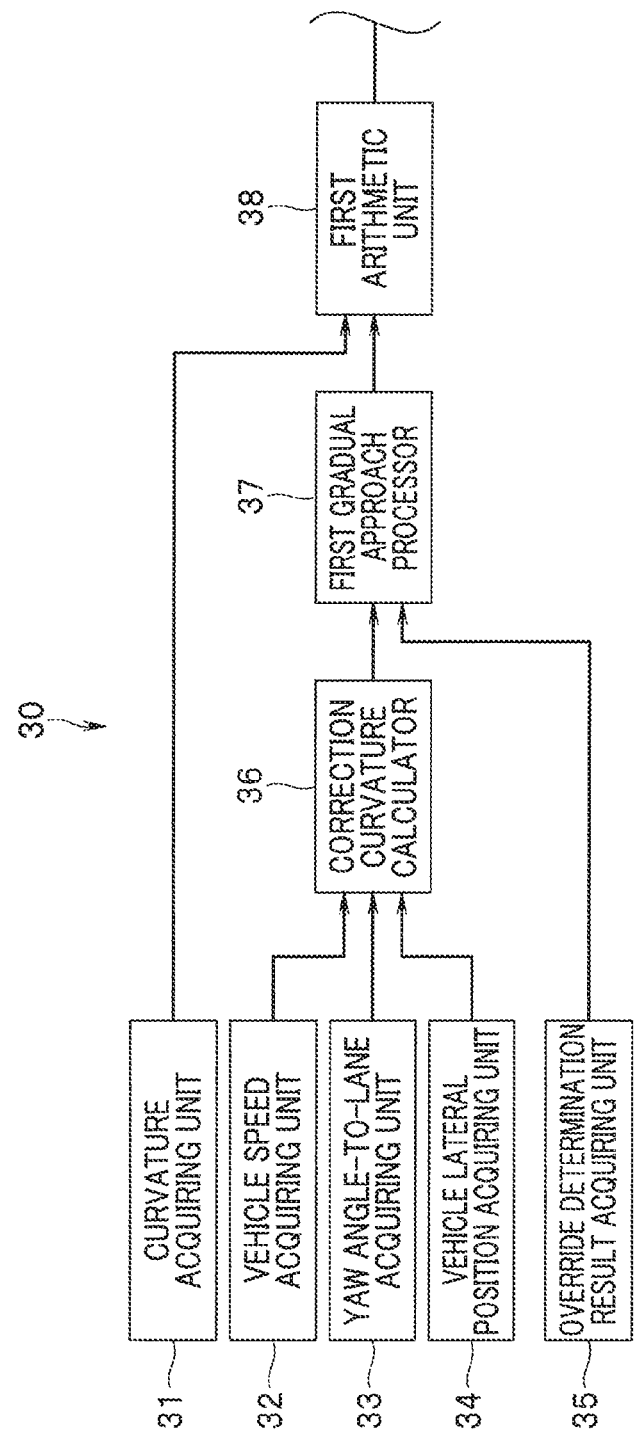
FIG. 4 is a functional block diagram illustrating a configuration of a first initial target steering angle calculator illustrated in FIG. 3.

Configurations of the first to third initial target steering angle calculators 30, 40, 50 will be described below. First, a configuration of the first initial target steering angle calculator 30 will be described with reference to FIG. 4. FIG. 4 is a functional block diagram illustrating a configuration of the first initial target steering angle calculator 30. The first initial target steering angle calculator 30 includes a curvature acquiring unit 31, a vehicle speed acquiring unit 32, a yaw angle-to-lane acquiring unit 33, a vehicle lateral position acquiring unit 34, and an override determination result acquiring unit 35.

The curvature acquiring unit 31 acquires information on a lane curvature from the lane recognizer 24 (see FIG. 2). The vehicle speed acquiring unit 32 acquires information on a vehicle speed of the vehicle 1 from the vehicle condition acquiring unit 14 (see FIG. 1), more specifically, the vehicle speed sensor. The yaw angle-to-lane acquiring unit 33 acquires information on a yaw angle to lane from the lane recognizer 24. The vehicle lateral position acquiring unit 34 acquires information on a vehicle lateral position of the vehicle 1 from the lane recognizer 24. The override determination result acquiring unit 35 acquires information on a determination result of an override determination or a determination result of a stoppage determination from the override determiner 11A (see FIG. 1).

The first initial target steering angle calculator 30 further includes a correction curvature calculator 36. The correction curvature calculator 36 executes a fourth arithmetic operation to calculate a correction curvature based on the vehicle speed information acquired by the vehicle speed acquiring unit 32, the information on the yaw angle to lane acquired by the yaw angle-to-lane acquiring unit 33, and the vehicle lateral position information acquired by the vehicle lateral position acquiring unit 34. The correction curvature is a curvature of a path of travel of the vehicle 1 from a current position of the vehicle 1 to an estimated position of the vehicle 1 at a predetermined point of time and is a curvature that makes a distance from the center of the lane, which is the target lateral position, to the estimated position zero. The predetermined point of time may be a point of time after a lapse of a certain period of time or may be a point of time after the vehicle 1 travels a certain distance.

The first initial target steering angle calculator 30 further includes a first gradual approach processor 37. The first gradual approach processor 37 performs processing for correcting the correction curvature calculated by the correction curvature calculator 36, based on the determination result from the override determiner 11A, the determination result being acquired by the override determination result acquiring unit 35. Note that depending on the determination result from the override determiner 11A, the first gradual approach processor 37 performs no processing for correcting the correction curvature. Hereinafter, the correction curvature at a stage preceding the first gradual approach processor 37 is also referred to as a "first correction curvature" and the correction curvature at a stage following the first gradual approach processor 37 is also referred to as a "second correction curvature". The second correction curvature is a curvature resulting from correction of the first correction curvature or a curvature that is the same as the first correction curvature.

The first initial target steering angle calculator 30 further includes a first arithmetic unit 38. The first arithmetic unit 38 performs a first arithmetic operation to calculate the first initial target steering angle using the lane curvature so that the vehicle 1 runs along the lane curvature. In the embodiment, the first arithmetic operation includes an arithmetic operation including calculation of a sum of the lane curvature and the second correction curvature and an arithmetic operation to calculate the first initial target steering angle using the sum of the lane curvature and the second correction curvature. The first initial target steering angle is a steering angle for the vehicle 1 to run along the lane curvature and the correction curvature.

Figure 5:
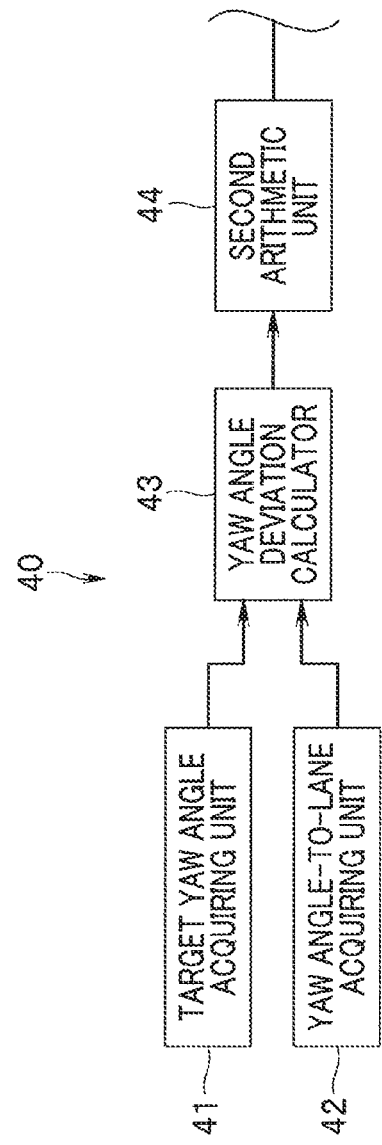
FIG. 5 is a functional block diagram illustrating a configuration of a second initial target steering angle calculator illustrated in FIG. 3.

Next, a configuration of the second initial target steering angle calculator 40 will be described with reference to FIG. 5. FIG. 5 is a functional block diagram illustrating a configuration of the second initial target steering angle calculator 40. The second initial target steering angle calculator 40 includes a target yaw angle acquiring unit 41 and a yaw angle-to-lane acquiring unit 42. As with the yaw angle-to-lane acquiring unit 33 illustrated in FIG. 4, the yaw angle-to-lane acquiring unit 42 acquires information on a yaw angle to lane from the lane recognizer 24 (see FIG. 2).

The target yaw angle acquiring unit 41 acquires information on a target yaw angle. The target yaw angle is a yaw angle of the vehicle 1 for making the vehicle 1 run along the lane. The target yaw angle may be calculated by the lane recognizer 24 (see FIG. 2). Alternatively, an arithmetic unit that calculates the target yaw angle may be provided in the second initial target steering angle calculator 40.

The second initial target steering angle calculator 40 further includes a yaw angle deviation calculator 43 and a second arithmetic unit 44. The yaw angle deviation calculator 43 calculates a yaw angle deviation, which is a difference between the target yaw angle and the yaw angle to lane, based on the target yaw angle information acquired by the target yaw angle acquiring unit 41 and the information on the yaw angle to lane acquired by the yaw angle-to-lane acquiring unit 42.

The second arithmetic unit 44 performs a second arithmetic operation to calculate the second initial target steering angle using the yaw angle deviation so that the yaw angle to lane agrees with the target yaw angle. In the embodiment, the second arithmetic unit 44 calculates the second initial target steering angle by means of feedback control using the yaw angle deviation. More specifically, the second arithmetic unit 44 calculates the second initial target steering angle by means of an arithmetic operation including multiplication of the yaw angle deviation by a predetermined feedback gain so that the yaw angle deviation becomes 0.

Also, in the embodiment, the second initial target steering angle is calculated so that the yaw angle to lane becomes 0°. In other words, in the embodiment, the target yaw angle is 0°.

Figure 6:
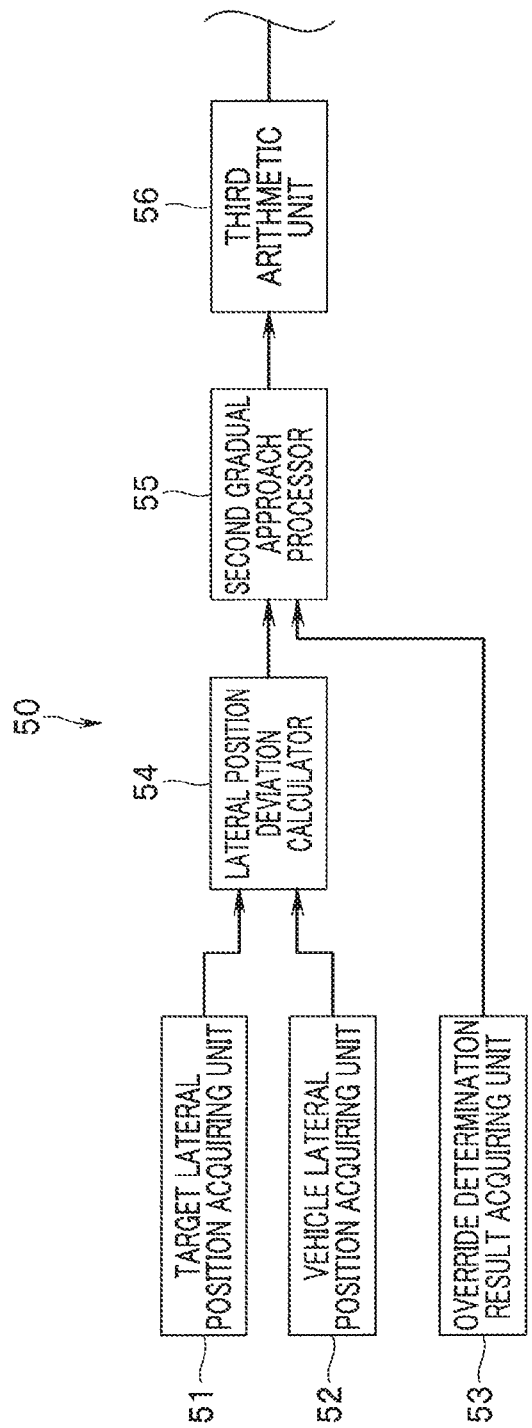
FIG. 6 is a functional block diagram illustrating a configuration of a third initial target steering angle calculator illustrated in FIG. 3.

Next, a configuration of the third initial target steering angle calculator 50 will be described with reference to FIG. 6. FIG. 6 is a functional block diagram illustrating a configuration of the third initial target steering angle calculator 50. The third initial target steering angle calculator 50 includes a target lateral position acquiring unit 51, a vehicle lateral position acquiring unit 52, and an override determination result acquiring unit 53. As with the vehicle lateral position acquiring unit 34 illustrated in FIG. 4, the vehicle lateral position acquiring unit 52 acquires information on a vehicle lateral position of the vehicle 1 from the lane recognizer 24 (see FIG. 2). As with the override determination result acquiring unit 35 illustrated in FIG. 4, the override determination result acquiring unit 53 acquires information on a determination result from the override determiner 11A.

The target lateral position acquiring unit 51 acquires information on a target lateral position from the lane recognizer 24 (see FIG. 2). As described above, in the embodiment, the target lateral position is the center of the lane.

The third initial target steering angle calculator 50 further includes a lateral position deviation calculator 54 and a second gradual approach processor 55. The lateral position deviation calculator 54 calculates a lateral position deviation, which is a difference between the target lateral position and the vehicle lateral position, based on the target lateral position information acquired by the target lateral position acquiring unit 51 and the vehicle lateral position information acquired by the vehicle lateral position acquiring unit 52.

The second gradual approach processor 55 performs processing for correcting the lateral position deviation calculated by the lateral position deviation calculator 54, based on the determination result from the override determiner 11A, the determination result being acquired by the override determination result acquiring unit 53. Note that depending on the determination result from the override determiner 11A, the second gradual approach processor 55 performs no processing for correcting the lateral position deviation. Hereinafter, the lateral position deviation at a stage preceding the second gradual approach processor 55 is also referred to as a "first lateral position deviation" and the lateral position deviation at a stage following the second gradual approach processor 55 is also referred to as a "second lateral position deviation". The second lateral position deviation is a deviation resulting from correction of the first lateral position deviation or a deviation that is the same as the first lateral position deviation.

The third initial target steering angle calculator 50 further includes a third arithmetic unit 56. The third arithmetic unit 56 performs a fifth arithmetic operation to calculate a third initial target steering angle using the lateral position deviation so that the vehicle lateral position agrees with a predetermined target lateral position. In the embodiment, the third arithmetic unit 56 calculates the third initial target steering angle by means of feedback control using the lateral position deviation. More specifically, the third arithmetic unit 56 calculates the third initial target steering angle by means of an arithmetic operation including multiplication of the lateral position deviation by a predetermined feedback gain so that the lateral position deviation becomes 0.

As described above, in the embodiment, the target lateral position is the center of the lane. Therefore, in the embodiment, the third initial target steering angle is calculated so that the vehicle lateral position agrees with the center of the lane.

Next, execution of the lane keeping control will be described. The lane keeping control is executed by, for instance, the driver turning on a switch for the lane keeping control. During execution of the lane keeping control, the first initial target steering angle is calculated by the first initial target steering angle calculator 30, the second initial target steering angle is calculated by the second initial target steering angle calculator 40, and the third initial target steering angle is calculated by the third initial target steering angle calculator 50. Then, the target steering angle is calculated by the steering angle calculator 60 and the steering torque is calculated by the steering torque calculator 70.

The EPS control unit 8 receives an instruction signal corresponding to the steering torque calculated by the steering torque calculator 70 and controls the EPS motor 7 based on the received instruction signal so that the steering torque is applied to the steering shaft 5. The lane keeping control is executed in such a manner as above.

Next, execution and stoppage of the override control will be described. As described above, a determination of whether to execute the override control, that is, the override determination, and the determination of whether to stop the override control and execute the normal lane keeping control, that is, the stoppage determination, are made by the override determiner 11A (see FIG. 1). In the embodiment, the override determiner 11A performs override determination processing and stoppage determination processing based on the vehicle lateral position calculated by the lane recognizer 24 in addition to the steering torque detected by the steering torque sensor 12.

Also, in the embodiment, an override determination flag is used as information corresponding to a determination result. In the embodiment, if the override determination flag is turned on from off during execution of the normal lane keeping control, the override control is executed. Also, if the override determination flag is turned off from on during execution of the override control, the override control is stopped and the normal lane keeping control is executed.

Note that as a result of the override determination flag being continuously off, the normal lane keeping control is continuously executed. Also, as a result of the override determination flag being continuously on, the override control is continuously executed.

Figure 7:
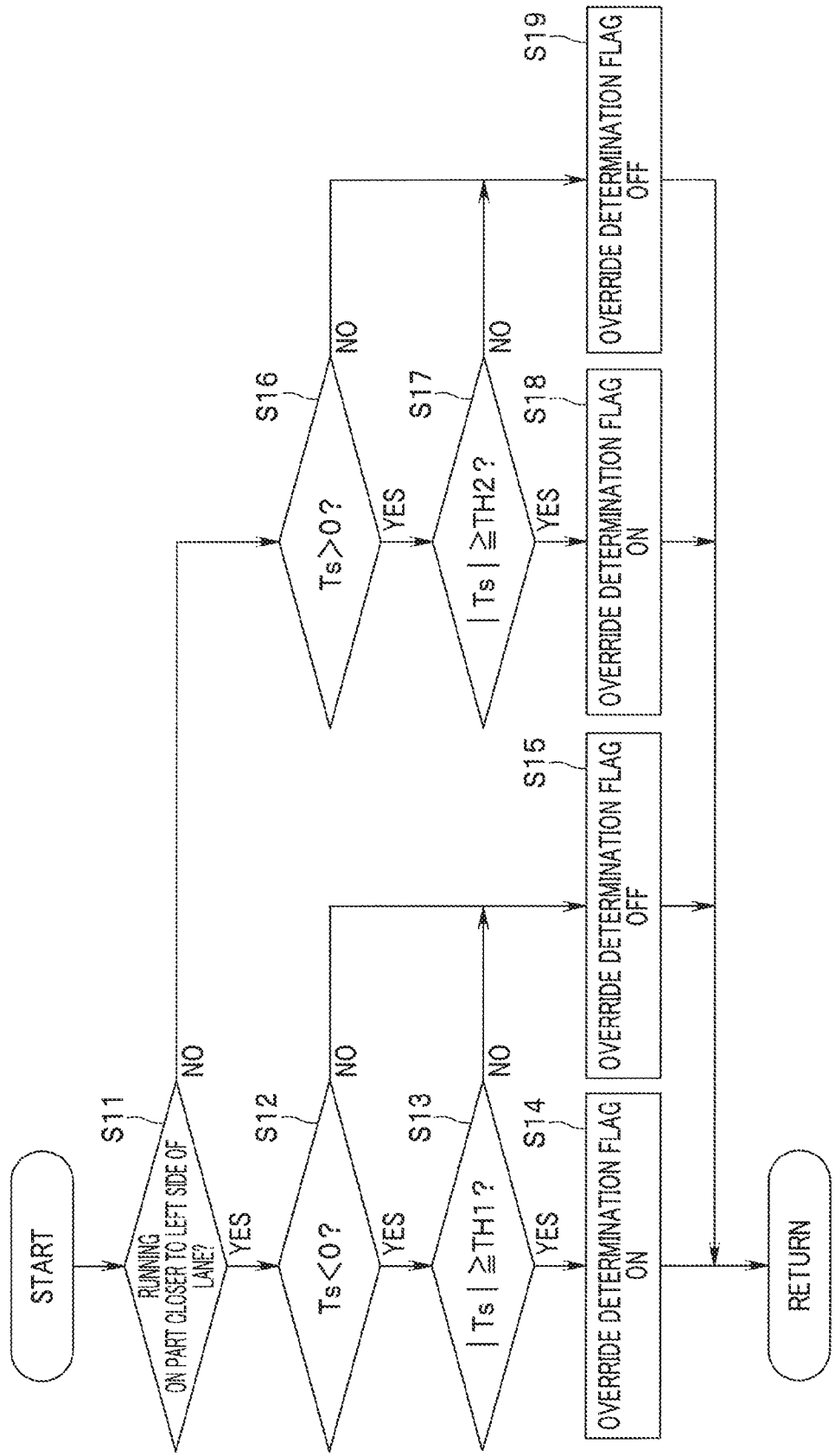
FIG. 7 is a flowchart illustrating an instance of determination processing by an override determiner in an embodiment of the technology.

The determination processing by the override determiner 11A will be described more specifically with reference to FIG. 7. FIG. 7 is a flowchart illustrating an instance of the determination processing by the override determiner 11A. During execution of the lane keeping control, steps illustrated in FIG. 7 are repeatedly performed in a predetermined cycle. In the determination processing, first, the vehicle lateral position information is acquired from the lane recognizer 24 and whether the vehicle 1 runs on a part closer to the left side of the lane is determined (step S11). More specifically, for instance, if the vehicle 1 is located at a position on the left side relative to the center of the lane, it is determined that the vehicle 1 runs on a part closer to the left side of the lane.

If it is determined in step S11 that the vehicle 1 runs on a part closer to the left side of the lane (YES), next, a determination is made on whether a direction of a steering torque is a direction deviating from the lane. More specifically, information on a steering torque is acquired from the steering torque sensor 12 and a determination is made on whether the direction of the steering torque is the left-turning direction (step S12). Here, a value of the steering torque is indicated by symbol Ts, and Ts is indicated by a negative value where a direction of operation of the steering wheel 4 is the left-turning direction and Ts is indicated by a positive value where the direction of operation of the steering wheel 4 is the right-turning direction. In step S12, for instance, whether the direction of the steering torque is the left-turning direction is determined according to whether Ts is a negative value.

In step S12, if the direction of the steering torque is the left-turning direction (YES), that is, if the direction of the steering torque is the direction deviating from the lane, next, a determination is made on whether an absolute value |Ts| of the steering torque is no less than a predetermined threshold value TH1 (step S13). If the absolute value |Ts| of the steering torque is no less than the predetermined threshold value TH1 (YES), next, the override determination flag is turned on (step S14).

If the direction of the steering torque is not the left-turning direction in step S12 (NO) and if the absolute value |Ts| of the steering torque is no more than the predetermined threshold value TH1 in step S13 (NO), next, the override determination flag is turned off (step S15).

If it is not determined in step S11 that the vehicle 1 runs on a part closer to the left side of the lane (NO), next, the determination is made on whether a direction of the steering torque is a direction deviating from the lane. More specifically, information on the steering torque is acquired from the steering torque sensor 12 and a determination is made on whether a direction of the steering torque is the right-turning direction (step S16). In step S16, for instance, the determination is made on whether the direction of the steering torque is the right-turning direction according to whether Ts is a positive value.

In step S16, if the direction of the steering torque is the right-turning direction (YES), that is, if the direction of the steering torque is a direction deviating from the lane, next, a determination is made on whether an absolute value |Ts| of the steering torque is no less than the predetermined threshold value TH2 (step S17). If the absolute value |Ts| of the steering torque is no less than the predetermined threshold value TH2 (YES), next, the override determination flag is turned on (step S18).

If the direction of the steering torque is not the right-turning direction (NO) in step S16 and if the absolute value |Ts| of the steering torque is no more than the predetermined threshold value TH2 (NO) in step S17, next, the override determination flag is turned off (step S19).

Note that the threshold value TH2 in step S17 may be the same as or different from the threshold value TH1 in step S13.

Next, processing for correcting a correction curvature calculated by the correction curvature calculator 36, which is performed by the first gradual approach processor 37 of the first initial target steering angle calculator 30, will be described with reference to FIG. 4. As described above, the first gradual approach processor 37 performs the correction processing based on a determination result from the override determiner 11A, which is acquired by the override determination result acquiring unit 35.

Here, a value of a correction curvature calculated during execution of the normal lane keeping control is referred to as a "first value". The first value is also a value of a correction curvature (first correction curvature) at a stage preceding the first gradual approach processor 37. During execution of the override control, the first gradual approach processor 37 corrects the value of the correction curvature to a second value, an absolute value of the second value being smaller than an absolute value of the first value. In the embodiment, specifically, the second value is 0. Also, in the embodiment, if the override determiner 11A makes a determination to execute the override control, that is, if the override determination flag is turned on from off during execution of the normal lane keeping control, the first gradual approach processor 37 makes the value of the correction curvature gradually approach the second value. Upon the value of the correction curvature reaching the second value, the first gradual approach processor 37 holds the value of the correction curvature at the second value.

Also, if the override determiner 11A makes a determination to stop the override control and execute the normal lane keeping control, that is, if the override determination flag is turned off from on during execution of the override control, the first gradual approach processor 37 makes the value of the correction curvature gradually approach the first value. In other words, the first gradual approach processor 37 makes the value of the correction curvature gradually approach the first value so that the value of the correction curvature returns to the value of the correction curvature (first correction curvature) at a stage preceding the first gradual approach processor 37. Upon the value of the correction curvature reaching the first value, the first gradual approach processor 37 ends the processing for correcting the correction curvature.

Note that when the value of the correction curvature is the second value, if the override determination flag is turned off from on, the first gradual approach processor 37 makes the value of the correction curvature gradually approach the first value from the second value. Also, if the override determination flag is turned off from on during gradual approach of the value of the correction curvature, the first gradual approach processor 37 makes the value of the correction curvature gradually approach the first value from the value at the time when the override determination flag was turned off from on.

Also, in the case where the first gradual approach processor 37 makes the value of the correction curvature gradually approach the first value or the second value, the first gradual approach processor 37 may make the value of the correction curvature gradually approach the first value or the second value by, for instance, gradually increasing or gradually decreasing the value of the correction curvature linearly for a predetermined period of time.

Next, processing for correcting the lateral position deviation calculated by the lateral position deviation calculator 54, which is performed by the second gradual approach processor 55 of the third initial target steering angle calculator 50, will be described with reference to FIG. 6. As described above, the second gradual approach processor 55 performs the correction processing based on a determination result from the override determiner 11A, which is acquired by the override determination result acquiring unit 53.

Here, a value of the lateral position deviation calculated during the normal lane keeping control is referred to as a "third value". The third value is also a value of the lateral position deviation (first lateral position deviation) at a stage preceding the second gradual approach processor 55. During execution of the override control, the second gradual approach processor 55 corrects the value of the lateral position deviation to a fourth value, an absolute value of the fourth value being smaller than an absolute value of the third value. In the embodiment, specifically, the fourth value is 0. Also, in the embodiment, if the override determiner 11A makes a determination to execute the override control, that is, if the override determination flag is turned on from off during execution of the normal lane keeping control, the second gradual approach processor 55 makes the value of the lateral position deviation gradually approach the fourth value. Upon the value of the lateral position deviation reaching the fourth value, the second gradual approach processor 55 holds the value of the lateral position deviation at the fourth value.

Also, if the override determiner 11A makes a determination to stop the override control and execute the normal lane keeping control, that is, if the override determination flag is turned off from on during execution of the override control, the second gradual approach processor 55 makes the value of the lateral position deviation gradually approach the third value. In other words, the second gradual approach processor 55 makes the value of the lateral position deviation gradually approach the third value so that the value of the lateral position deviation returns to the value of the lateral position deviation (first lateral position deviation) at a stage preceding the second gradual approach processor 55. Upon the value of the lateral position deviation reaching the third value, the second gradual approach processor 55 ends the processing for correcting the lateral position deviation.

Note that when the value of the lateral position deviation is the fourth value, if the override determination flag is turned off from on, the second gradual approach processor 55 makes the value of the lateral position deviation gradually approach the third value from the fourth value. Also, if the override determination flag is turned off from on during the gradual approach of the value of the lateral position deviation, the second gradual approach processor 55 makes the value of the lateral position deviation gradually approach the third value from the value at the time when the override determination flag was turned off from on.

Also, in a case where the second gradual approach processor 55 makes the value of the lateral position deviation gradually approach the third value or the fourth value, the second gradual approach processor 55 may make the value of the lateral position deviation gradually approach the third value or the fourth value by, for instance, gradually increasing or gradually decreasing the value of the lateral position deviation linearly for a predetermined period of time.

Figure 8:
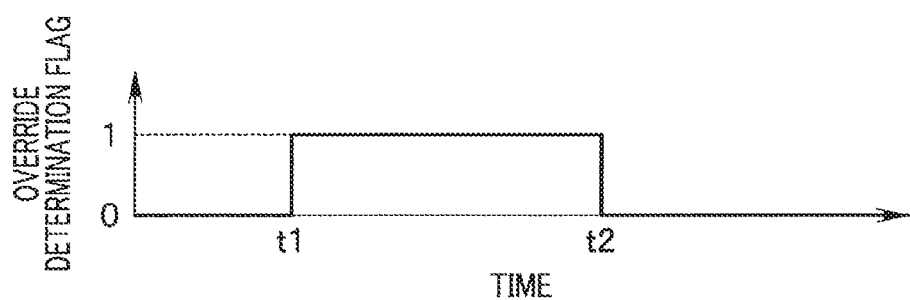
FIG. 8 is a diagram schematically illustrating changes of an override determination flag in an embodiment of the technology.

Next, a specific instance of the correction processing by the first gradual approach processor 37 and the correction processing by the second gradual approach processor 55 will be described. Here, the description will be provided taking the correction processing by the second gradual approach processor 55 as an example. FIG. 8 is a diagram schematically illustrating changes of the override determination flag. In FIG. 8, the abscissa axis represents time and the ordinate axis represents the value of the override determination flag. In FIG. 8, 0 indicates the value of the override determination flag when the override determination flag is off and 1 indicates the value of the override determination flag when the override determination flag is on. The override determination flag is turned on from off at time t1 and turned off from on at time t2.

Figure 9:
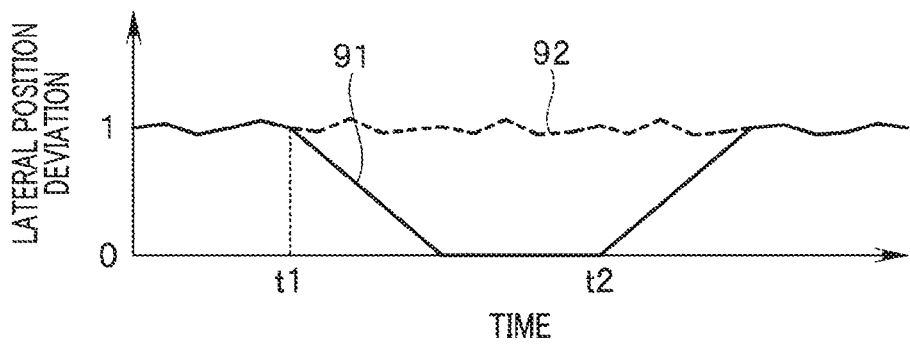
FIG. 9 is a diagram schematically illustrating changes of a lateral position deviation in an embodiment of the technology.

FIG. 9 is a diagram schematically illustrating changes of a value of the lateral position deviation. In FIG. 9, the abscissa axis represents time and the ordinate axis represents the lateral position deviation. Note that in FIG. 9, the lateral position deviation is standardized so that an average value of the lateral position deviation (first lateral position deviation) before correction processing becomes 1. Also, in FIG. 9, the fourth value is 0. Also, in FIG. 9, reference numeral 91 indicates the lateral position deviation corrected by the second gradual approach processor 55 and reference numeral 92 indicates the uncorrected lateral position deviation (first lateral position deviation).

As illustrated in FIGS. 8 and 9, when the override determination flag is turned on from off at time t1, the second gradual approach processor 55 starts processing for making the value of the lateral position deviation gradually approach 0. In an instance illustrated in FIG. 9, the second gradual approach processor 55 makes the value of the lateral position deviation gradually approach 0 by gradually decreasing the value of the lateral position deviation linearly for a predetermined period of time. After the value of the lateral position deviation reaches 0, the second gradual approach processor 55 holds the state in which the value of the lateral position deviation is 0.

Also, when the override determination flag is turned off from on at time t2, the second gradual approach processor 55 starts processing for making the value of the lateral position deviation gradually approach the value of the uncorrected lateral position deviation. In the instance illustrated in FIG. 9, the second gradual approach processor 55 makes the value of the lateral position deviation gradually approach the value of the uncorrected lateral position deviation (first lateral position deviation) by gradually increasing the value of the lateral position deviation linearly for a predetermined period of time. After the value of the lateral position deviation reaches the value of the uncorrected lateral position deviation, the second gradual approach processor 55 ends the correction processing.

The description has been provided so far by taking the correction processing by the second gradual approach processor 55 as an example. The correction processing by the first gradual approach processor 37 is basically similar to the correction processing by the second gradual approach processor 55 described with reference to FIGS. 8 and 9.

Next, operation and effects of the lane keeping controller 11 according to the embodiment will be described. In the embodiment, the target steering angle is calculated by the first initial target steering angle calculator 30, the second initial target steering angle calculator 40, the third initial target steering angle calculator 50, and the steering angle calculator 60, and during execution of the override control, the lane curvature and the yaw angle deviation are not corrected and the target steering angle is made to be small in comparison with that during execution of the normal lane keeping control.

In the embodiment, the target steering angle is made to be small by the correction processing by the first gradual approach processor 37 and the correction processing by the second gradual approach processor 55. In other words, in the embodiment, during execution of the override control, the first gradual approach processor 37 corrects the correction curvature so that an absolute value of the correction curvature becomes small. Upon the absolute value of the correction curvature becoming small, the first initial target steering angle becomes small and as a result, the target steering angle also becomes small. Also, in the embodiment, during execution of the override control, the second gradual approach processor 55 corrects the lateral position deviation so that an absolute value of the lateral position deviation becomes small. Upon the absolute value of the lateral position deviation becoming small, the third initial target steering angle becomes small and as a result, the target steering angle also becomes small.

In the embodiment, during execution of the override control, the target steering angle is made to be small in comparison with that during execution of the normal lane keeping control. Consequently, the embodiment enables making a control torque small, the control torque acting in a direction opposite to a direction of operation by a driver during execution of the override control, and as a result, enables suppressing an odd feeling to be given to the driver. Also, the embodiment enables the driver to recognize that the override control is being executed, by means of the aforementioned control torque acting during execution of the override control.

Also, in the embodiment, the lane curvature and the yaw angle deviation are not corrected and the target steering angle is made to be small. In other words, in the embodiment, the vehicle 1 is controlled so that, even during execution of the override control, the vehicle 1 runs along the lane curvature and the yaw angle to lane agrees with a predetermined target yaw angle. Consequently, the embodiment is capable of preventing the vehicle 1 from deviating from the running lane during execution of the override control.

Also, in the embodiment, in correcting the correction curvature, the first gradual approach processor 37 makes the value of the correction curvature gradually approach a predetermined value. Likewise, in correcting the lateral position deviation, the second gradual approach processor 55 makes the value of the lateral position deviation gradually approach a predetermined value. Consequently, the embodiment enables the gradual change of the target steering angle and as a result enables further suppression of an odd feeling to be given to the driver.

In the embodiment, the first gradual approach processor 37 brings the value of the correction curvature to the second value, that is, 0 by means of the correction processing.

Likewise, the second gradual approach processor 55 brings the value of the lateral position deviation to the fourth value, that is, 0 by means of the correction processing. In the case where the respective values of the correction curvature and the lateral position deviation are 0, no control for moving the vehicle 1 closer to the center of the lane is performed. The technology is not limited to the above-described embodiment and various changes, alterations, and the like are possible without departing from the gist of the technology.

The lane keeping controller 11 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA), other than the aforementioned microcomputer. At least one processor can be configured, by reading instructions from at least one machine readable tangible medium, to perform all or a part of functions of the lane keeping controller 11 including the override determiner 11A (see FIG. 1), the first to third initial target steering angle calculators 30, 40, 50, and the steering angle calculator 60 (see FIG. 3). Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the modules shown in FIGS. 1 and 3.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A lane keeping controller configured to perform lane keeping control to make an own vehicle to run along a lane, the lane keeping controller being capable of selectively executing first control and second control that are different from each other in manner of the lane keeping control, as the lane keeping control, the lane keeping controller comprising:

a curvature acquiring unit configured to acquire information on a lane curvature that is a curvature of the lane;

a yaw angle-to-lane acquiring unit configured to acquire information on a yaw angle to lane that is a yaw angle of the own vehicle relative to the lane;

a steering torque acquiring unit configured to acquire information on a steering torque of steering by a driver;

a determiner configured to determine whether to execute the second control, on a basis of the steering torque; and a steering angle calculating unit configured to calculate a target steering angle of the own vehicle in the lane keeping control, wherein during execution of the first control, if a direction of the steering torque is a direction deviating from the lane and a magnitude of the steering torque is no less than a predetermined threshold value, the determiner makes a determination to execute the second control, and the steering angle calculating unit performs a first arithmetic operation to calculate a first initial target steering angle using the lane curvature so that the own vehicle runs along the lane curvature, a second arithmetic operation to calculate a second initial target steering angle using a yaw angle deviation that is a difference between a predetermined target yaw angle and the yaw angle to lane so that the yaw angle to lane agrees with the predetermined target yaw angle, and a third arithmetic operation to calculate the target steering angle by an arithmetic operation including calculation of a sum of the first initial target steering angle and the second initial target steering angle, and during execution of the second control, does not correct the lane curvature and the yaw angle deviation and makes the target steering angle small in comparison with the target steering angle during the execution of the first control.

2. The lane keeping controller according to claim 1, further comprising:

a vehicle speed acquiring unit configured to acquire information on a vehicle speed of the own vehicle; and a vehicle lateral position acquiring unit configured to acquire information on a vehicle lateral position that is a position in a vehicle width direction of the own vehicle in the lane, wherein the steering angle calculating unit further performs a fourth arithmetic operation to calculate a correction curvature that is a curvature of a path of travel of the own vehicle from a current position of the own vehicle to an estimated position of the own vehicle at a predetermined point of time and is a curvature that makes a distance from a predetermined target lateral position to the vehicle lateral position at the estimated position zero, using the vehicle speed, the yaw angle to lane, and the vehicle lateral position, the first arithmetic operation comprises an arithmetic operation including calculation of a sum of the lane curvature and the correction curvature and calculation of the first initial target steering angle using the sum of the lane curvature and the correction curvature, and where a value of the correction curvature calculated during execution of the first control is a first value, during execution of the second control, the steering angle calculating unit corrects the value of the correction curvature to a second value, an absolute value of the second value being smaller than an absolute value of the first value.

3. The lane keeping controller according to claim 2, wherein the second value is 0.

4. The lane keeping controller according to claim 2, wherein if the determiner makes a determination to execute the second control, the steering angle calculating unit makes the value of the correction curvature gradually approach the second value.

5. The lane keeping controller according to claim 2, wherein:

during execution of the second control, the determiner further determines whether to stop the second control and execute the first control, on the basis of the steering torque; and if the determiner makes a determination to stop the second control and execute the first control, the steering angle calculating unit makes the value of the correction curvature gradually approach the first value.

6. The lane keeping controller according to claim 2, wherein the predetermined target lateral position is a center of the lane.

7. The lane keeping controller according to claim 1, further comprising a vehicle lateral position acquiring unit configured to acquire information on a vehicle lateral position that is a position in a vehicle width direction of the own vehicle in the lane, wherein
- the steering angle calculating unit further performs a fifth arithmetic operation to calculate a third initial target steering angle using a lateral position deviation that is a difference between a predetermined target lateral position and the vehicle lateral position so that the vehicle lateral position agrees with the predetermined target lateral position;
- the target steering angle is calculated by an arithmetic operation to calculate a sum of the first initial target steering angle, the second initial target steering angle, and the third initial target steering angle; and
- in a case where a value of the lateral position deviation calculated during execution of the first control is a third value, during execution of the second control, the steering angle calculating unit corrects the value of the lateral position deviation to a fourth value, an absolute value of the fourth value being smaller than an absolute value of the third value.

8. The lane keeping controller according to claim 7, wherein the fourth value is 0.

9. The lane keeping controller according to claim 7, wherein if the determiner makes a determination to execute the second control, the steering angle calculating unit makes the value of the lateral position deviation gradually approach the fourth value.

10. The lane keeping controller according to claim 7, wherein:
- during execution of the second control, the determiner further determines whether to stop the second control and execute the first control, on the basis of the steering torque; and
- if the determiner makes a determination to stop the second control and execute the first control, the steering angle calculating unit makes the value of the lateral position deviation gradually approach the third value.

11. The lane keeping controller according to claim 7, wherein the predetermined target lateral position is a center of the lane.

12. A lane keeping controller configured to perform lane keeping control to make an own vehicle to run along a lane, the lane keeping controller being capable of selectively executing first control and second control that are different from each other in manner of the lane keeping control, as the lane keeping control, the lane keeping controller comprising
- circuitry configured to acquire information on a lane curvature that is a curvature of the lane, acquire information on a yaw angle to lane that is a yaw angle of the own vehicle relative to the lane, acquire information on a steering torque of steering by a driver, determine whether to execute the second control, on a basis of the steering torque, and calculate a target steering angle of the own vehicle in the lane keeping control, wherein
- during execution of the first control, if a direction of the steering torque is a direction deviating from the lane and a magnitude of the steering torque is no less than a predetermined threshold value, the circuitry makes a determination to execute the second control, and performs a first arithmetic operation to calculate a first initial target steering angle using the lane curvature so that the own vehicle runs along the lane curvature, a second arithmetic operation to calculate a second initial target steering angle using a yaw angle deviation that is a difference between a predetermined target yaw angle and the yaw angle to lane so that the yaw angle to lane agrees with the predetermined target yaw angle, and a third arithmetic operation to calculate the target steering angle by an arithmetic operation including calculation of a sum of the first initial target steering angle and the second initial target steering angle, and during execution of the second control, does not correct the lane curvature and the yaw angle deviation and makes the target steering angle small in comparison with the target steering angle during the execution of the first control.

* * * * *